United States Patent [19]
Lawrence

[11] Patent Number: 6,131,831
[45] Date of Patent: Oct. 17, 2000

[54] PORTABLE AUTOMOBILE UNDERCARRIAGE WASHER

[76] Inventor: John S. Lawrence, P.O. Box 41, Kemblesville, Pa. 19347

[21] Appl. No.: 09/312,088

[22] Filed: May 15, 1999

[51] Int. Cl.$^7$ ................ B05B 3/00; B05B 3/18
[52] U.S. Cl. .............. 239/722; 239/312; 134/123
[58] Field of Search ................ 239/722, 754, 239/310, 312, 315, 316, 317, 279; 134/123, 172

[56] References Cited

U.S. PATENT DOCUMENTS

| | | | |
|---|---|---|---|
| 2,761,732 | 9/1956 | Anthon | 239/754 |
| 4,580,726 | 4/1986 | Unger | 239/722 |
| 4,956,883 | 9/1990 | Lane | 239/310 X |
| 4,984,746 | 1/1991 | Joyal | 239/722 |
| 5,820,037 | 10/1998 | Lawrence | 239/722 |

Primary Examiner—Andres Kashnikow
Assistant Examiner—Sean P. O'Hanlon

[57] ABSTRACT

An improved portable automobile undercarriage washing/cleaning device consisting of an ovoid, bowl-like body portion on the top surface of which is centered a detachable water spray nozzle and an accompanying nearby small tube, which itself connects the interior fluid chamber/reservoir, the fluid consisting of a mixture of detergent and water, with the exterior of the body, the same tube directing a pressurized mixture of detergent and water into the water spray pattern emanating from the nozzle, the mixture then being admixed with the spray, the whole of which when attached via a side connection on the body, to a rigid, non-flexible water pipe, which is itself connected to a garden-type hose via a pistol-grip water control valve, produces a pressurized water spray pattern capable of removing accumulated road salt and debris deposited onto the underside of an automobile or other wheeled vehicle and effecting a rapid removal of the debris from the undercarriage of the automobile or other wheeled vehicle and its related structural members.

9 Claims, 4 Drawing Sheets

PORTABLE AUTOMOBILE UNDERCARRIAGE WASHER

BACKGROUND OF THE INVENTION

The invention relates to washing/cleaning devices and in particular to an improved device that is capable of washing debris such as road salt, mud, etc. which has accumulated on the under-side of an automobile or other vehicle, while in the normal courses of travel on roadways featuring this sort of debris scattered on their surfaces.

It has been illustrated and described in prior art and, specifically in U.S. Pat. No. 5,820,037, that there is a problem in the course of normal driving conditions with motor vehicles in particular, at various times of the year and different types of road surfaces, with the accumulation of common substances such as mud and weather related road salt de-icing application in that these materials, which are randomly found on the road surface, are carried simply by the action of the vehicle passing over them, either in a moist or dry form, up and onto the undercarriage of the vehicle and are liberally dispersed onto and into the many convoluted surfaces found on the undercarriage of a motor vehicle. It is also well known that, if allowed to remain in position for extended periods of time, such debris as road salt or mud can and will cause the premature failure of protective coatings applied to the undercarriage parts as well as rapid deterioration of bare or chipped metal surfaces. The corrosive effects of these common materials are well known if not removed in a timely fashion. Not only are large portions of undercarriage sheet metal gradually eaten away through the action of rust, but also important structural members of the vehicle, their attachments and connecting hardware can be virtually destroyed by long-term exposure to elements such as road salt, mud, etc.

The rational for removing accumulations of harmful agents from the undercarriage of a motor vehicle is well documented and is most conveniently done in a professional machine-type, drive through car wash. However, such a treatment is not always readily available, and indeed, in some areas of the country, may not exist. It would be ideal for the owner of a motor vehicle to have a device available at home which would allow the operator the option to readily cleanse the undercarriage of the vehicle with very little effort, good results, and low cost.

It is the object of this invention to provide a device that is capable of delivering a powerful water spray pattern with optional detergent and automatic rinse features, using the readily available home water pressure and a common garden hose connection, which will effectively remove the accumulated road salt, mud, etc. from the undercarriage of the vehicle.

SUMMARY OF THE INVENTION

In the preferred embodiment, the invention consists of a number of interrelated members that when joined together consist of an ovoid, bowl-like body, optional wheels, a connecting rigid, non-flexible water pipe, a pistol-grip water control valve and a garden hose. The device as outlined in U.S. Pat. No. 5,820,037 fulfills the basic function of providing a spray of pressurized water in a pattern which is designed to effectively remove the accumulated debris on the undercarriage of a vehicle in a simple, convenient manner without undue exertion. However, it is very desirable to improve the device via a change in function of the base portion of the body to allow for use of the device on all surfaces found under a motor vehicle, be they paved, gravel, soft soil, snow covered, etc. with or without the use of wheels. In some instances, it would be desirable to have no wheels whatsoever, due to the fact that substances such as gravel would seriously interfere with the operation of the wheels, causing the device to "snag" and to impede free movement underneath of the vehicle. In addition, the provision and use of a detergent car washing soap preparation would allow a tremendous increase in the cleaning ability that would be apparent with only the water spray alone. The body portion of the device itself consists of an upper convex shell and matching lower concave piece that are joined together with a central fastener. The upper and lower joined parts make up the exterior portion of the body and provide the platform for a centrally located top nozzle, a small adjacent tube, and side optional wheels. The lower portion of the body has a unique sled-like shape, which allows the device to be used, as mentioned, over many surfaces with little resistance. When connected to the top section of the body via an inserted, rigid plastic-type pin fastener, the bottom section seals together with the top section and makes up the complete body of the device. Also, a completely sealed inner reservoir is created by joining the top and bottom portions of the device, which acts as a container for a mixture of detergent car wash soap preparation and water.

Around the perimeter of the top portion of the bottom section is found an indentation, which is matched by an indentation found on the perimeter of the lower rim of the top section. Passing through a centered hole in the bottom section, a rigid, plastic-type pin fastener is pushed up to engage a corresponding locking indentation found in the lower center of the top section, directly below and part of the bulk of the interior water tube. As the pin is engaged, the bottom section of the device slightly flexes and is forced into the lower perimeter indentation of the top section. When the pin "locks" into its seat, a water-tight seal is created around the perimeter meeting of the top and bottom sections of the device.

As mentioned, the bottom portion of the device is dished and sled-like. This allows the operator to move the device in any direction via control of the rigid ¾ inch water connecting pipe. The sled-like shape creates very little friction with the ground surface underneath of the vehicle to be cleaned as it is moved along and thus, the device can be universally moved about over the roughest or smoothest surfaces at will.

There are many instances in which the operator will encounter no significant ground texture problems and then it would be desirable to have wheels attached onto the body of the device to speed delivery of the water spray to the undersurface of the vehicle. The wheels are attached via a plastic-type pin fastener, also called a drive fastener, through the center of the wheel and into the side section of the top portion of the device, where there is found a complementary locking shape formed into the side portion of the body. As the drive fastener is fixed, the wheels become an integral part of the main body of the device.

The top section contains a tube which passes through and is flush with the top of the top portion of the device. After a short passage downward into the interior of the device, the tube bends at an approximate 90 degree angle, perpendicular to the top of the device and proceeds out to and through the end portion of the top section. It is important to note that the tube has an approximate ¼ inch diameter at the top of the device and gradually, along the course of the tube, the diameter of the tube increases or flares to approximately ¾ inch diameter at its terminus on the outside of the top section. The same configuration can be accomplished by having a tube of approximately ¼ inch diameter join a tube of approximately ¾ inch diameter at a right angel in a seamless joint. At the top section of the tube, threads are formed into the tube itself in order to accept a threaded nozzle, the same which protrudes out from the top section. At the other end of the tube, a connection is permanently fixed in place on the tube after the tube has passed through the wall of the end of the top section of the device. This connection can be threaded or not threaded, but is designed to accept another complimentary fitting which will connect the device with and to another approximately ¾ inch diameter tube. This tube or pipe that has been so connected, extends out from the body of the device approximately 20 inches in a straight-line course and then gently bends at an approximate 45 to 55 degree angle and continues for approximately another 30 inches to be then connected via a complimentary fitting to a water control valve device that is capable of regulating the inflow of water, under pressure, whose source is a connecting standard garden hose or the like, which is itself connected to a standard water faucet.

The removable spray nozzle is centered on the top of the main body of the invention, as previously mentioned. Adjacent to, but separated slightly from the nozzle orifice along the long axis of the top portion of the body is a small diameter tube. This tube connects the interior fluid reservoir to the exterior of the top of the main body and is slightly angled toward the fan spray pattern emanating from the nozzle. The function of the tube is to convey a pressurized mixture of detergent and water via a water stream directly into the base portion of the fan spray pattern. As the nozzle water is expressed, it picks up the detergent mixture stream and incorporates the mix into the main pressurized flow of water, and thus the detergent is carried onto the undercarriage of the automobile where it assists in cleaning away the accumulated road debris. The concentration of detergent mix is controlled by the addition of pure detergent solution through a small removable screw-cap on the other side of the nozzle, opposite the tube, but in the same long axis as the tube.

The interior fluid reservoir and contents are pressurized via water pressure. An approximate 1/32 inch hole is found immediately at the "right angle" of the interior water tube. As the main stream of pressurized water flows through the interior water tube from the connecting exterior water pipe, a small, but sufficient amount of water is expressed through the 1/32 inch diameter hole. This pressurized water mixes with the detergent and rapidly fills the interior fluid chamber with an agitated mixture of detergent and water, which is the expressed continuously through the connecting small diameter tube to the exterior top portion of the body and thence into the fan spray pattern. As the water continues to flow into the interior fluid chamber, it gradually dilutes the detergent solution and a weaker and weaker mix of detergent and water is apparent at the end of the fan spray pattern. In a short amount of time, pure water is expressed from the small diameter tube and into the fan spray pattern. With no further detergent solution in the interior fluid chamber, the fan spray acts as a "rinse" cycle, removing all of the remaining detergent-water mix from the undercarriage of the vehicle. If desired, a simple addition of more detergent through the screw-cap opening will repeat the cycle, effecting a "wash and rinse" action over and over.

It becomes apparent, then, that this improved automobile undercarriage washing device has features not available previously and that these additions and changes greatly add to the use, convenience, and functionality of the device.

DETAILED DESCRIPTION OF THE INVENTION

Figure 1:
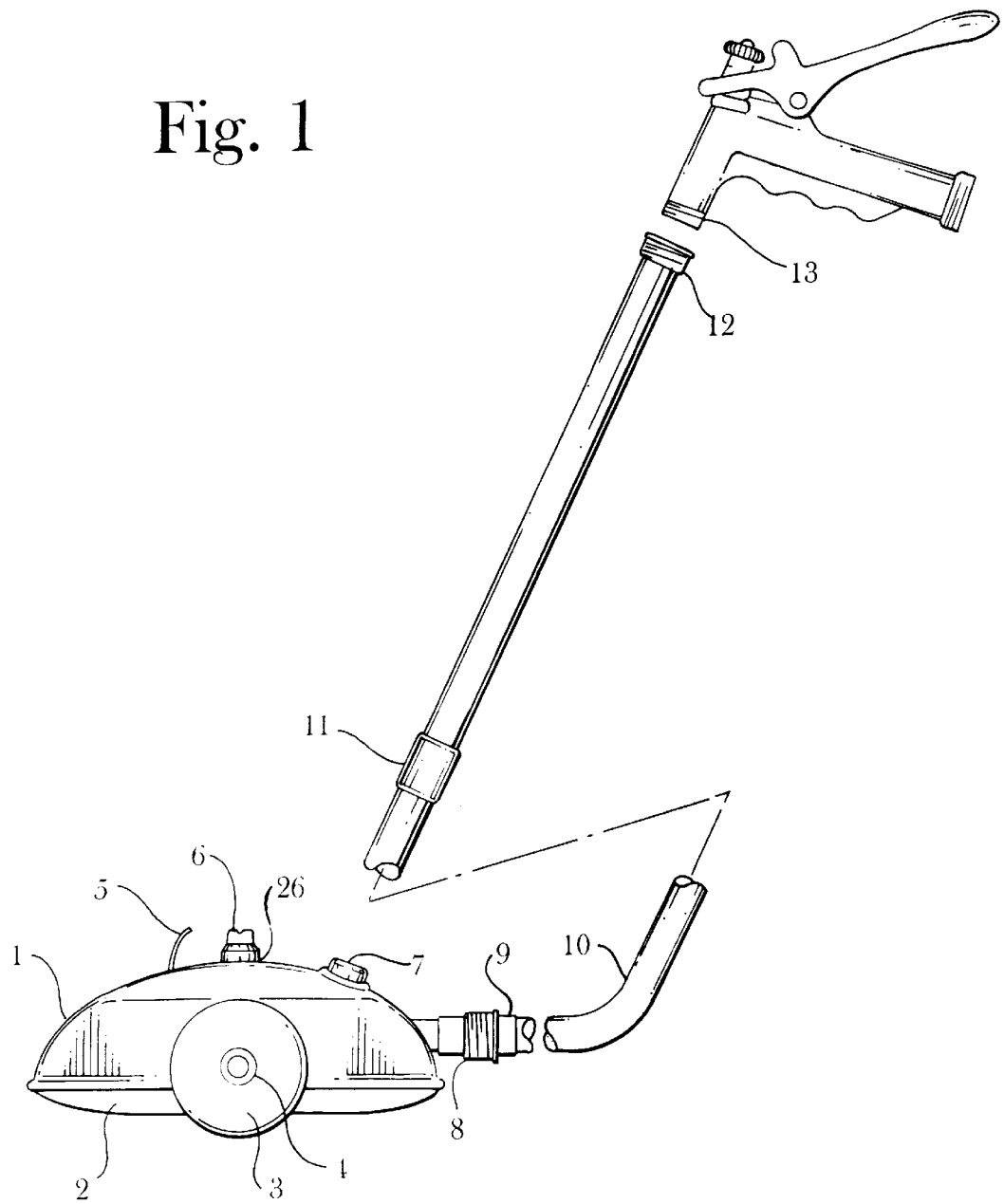
FIG. 1 is a perspective of the illustrative embodiment of this invention

As shown in FIG. 1 an illustrative embodiment of the vehicle undercarriage washing/cleaning device comprises a main body upper portion 1 which is joined together with a lower ovoid disk-like sled-shaped lower portion 2, the both joined together comprising the completed body of the device, to which is optionally attached at least two wheels 3 with at least two drive fasteners 4, the same which not only attach the wheels to the main body of the device, but also act as axles around which the wheels 3 rotate. In the top of the main body of the device is found a removable water spray nozzle 6 which is itself threaded into the interior water tube 26, which ends on the top of the body completely flush with the surface of the top of the body, and, slightly separated from the nozzle, but along the same long axis of the body, is found a small diameter tube 5 through which passes a stream of pressurized mix of detergent solution and water or, when no detergent is present in the interior fluid chamber/reservoir, pure water. The tube is slightly angulated toward the nozzle so that when the pressurized water spray pattern is developed at the nozzle, when the device is activated with pressurized water, the pressurized stream of water or detergent-water mix emanating from the small diameter tube is directly injected into the base of the nozzle spray pattern, thus co-mingling the detergent-water mix from the interior fluid reservoir with the main nozzle water spray pattern. Opposite from the small diameter tube, but along the same long axis of the top of the body and on the other side of the nozzle is found a cap screw 7, which can be removed to allow the operator of the device to introduce via a pouring action, detergent solution into the interior cavity fluid chamber of the main body of the device. The screw cap 7 is screwed down into place before the pressurized water is allowed to enter the main body of the device via the interior water tube 26. The interior water tube 26 is constructed of a rigid tube-like material and extends from the top of the main body of the device, where it features a threaded section, which itself engages the removable nozzle 6. The inside diameter is approximately ¼ inch at this starting point. The interior water tube 26 then proceeds in a downward direction, perpendicular to the top of the main body of the device in an approximate straight-line course for about 2 inches, more or less, and then bends in an approximate 90 degree angle and thence proceeds in a straight-line course parallel to the top of the main body of the device for an approximate distance of 5 inches. The terminus of the interior water tube 26 is found protruding through the outside wall of the main body of the device and ends in a standard female plumbing connection 8, which is itself threaded to receive the connecting threaded male terminus 9 which is connected to water pipe 10. It would be possible to substitute a "quick connect" device, the female portion of such a device mounted in the position 8 and the make connection mounted to the matching end 9 of the rigid water pipe 10. As the interior water tube 26 proceeds from the point of the 90 degree bend, the internal diameter of the interior water tube 26 flares to a final diameter of ¾ inch, matching the diameter of the rigid water pipe 10. Upon being connected to the terminus of the interior water tube 8, the rigid, non-flexible water pipe 10 proceeds along a straight course, parallel to the main body of the device for approximately 20 inches and the via a gentle curve of approximately 45 to 55 degrees, proceeds along its straight upward course for approximately another 30 inches. It is desirable that the rigid, non-flexible water pipe be made in two sections for dis-assembly and ease of storage when the device is not in use, and a threaded or "quick connect" connection is provided 11. At the terminus of the rigid water pipe 10, a common ¾ inch female threaded garden hose type connector is attached to the rigid water pipe 10. This allows for connection of a water control valve mechanism 13 with a complimentary threaded end to engage the terminus of the rigid water pipe 10. By means of a water control valve, such as a common pistol-grip device, the operator can infinitely control the amount and rate of water flow into the completely assembled automobile undercarriage washing/cleaning device. The threaded terminus 12 allows the operator to quickly connect the control valve mechanism to the rigid water pipe 10, and, via water from a standard house faucet, which is itself carried through the common ¾ inch garden-type hose, the said water passes through the pistol-grip control valve mechanism, through the rigid water pipe 10, into and through the interior water tube 26, and thence exiting through the nozzle 6 via a large, fan-shaped pattern and onto the underbody of the automobile for a cleaning/washing action of the pressurized water as it contacts the underbody members.

Figure 2:
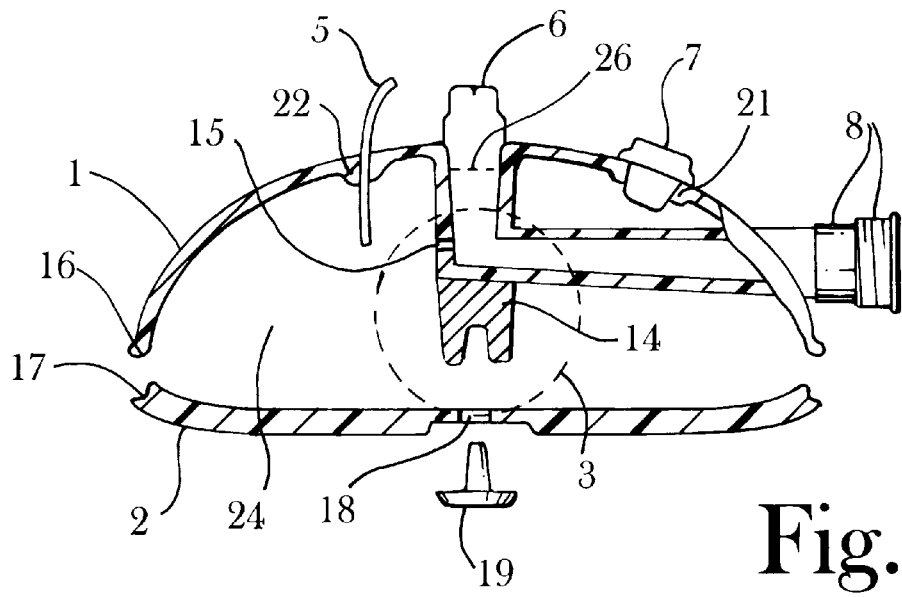
FIG. 2 is an exploded side cut-away view of the body showing the interior construction of the body as shown in FIG. 1

FIG. 2 shows an exploded, cut-away view of the main body of the undercarriage washing/cleaning device with a shadow indication of the position of the side wheel 3 shown for illustrative purposes. The upper portion of the main body 1 is shown detached from the lower portion of the main body 2. Around the lower perimeter of the upper portion of the main body 1 is an inset 16. The lower portion of the main body 2 features an inset 17 completely around its upper perimeter. When the upper 1 and lower 2 portions of the main body are joined together, the lower portion 2 inset 17 is pressed into and engages the lower perimeter of the upper portion 1 at its inset 16. As the two halves of the body 1 and 2 are joined together, the lower portion 2 slightly flexes as the engaging drive pin 19 passes through a centered hole opening 18 in the lower portion 2 and the drive pin 19 has a positive locking seat in a preparing opening 14, which is found at the base of the interior water tube 26 component found in the interior of the upper portion 1 of the main body. When the two inset areas 16 and 17 are joined, the slight flexing of the lower body portion 2 provides a virtual water-tight seal between the upper 1 and lower 2 portions of the main body of the device. The prepared, centered hole opening 18 as found in the lower portion 2 of the main body is slightly recessed. This allows for the "head" of the drive pin 19 to be recessed into the lower portion 2 of the main body. When the lower portion 2 of the main body comes in contact with the ground area underneath of the automobile, the "head" portion of the drive pin 19 is protected from excessive wear and tear. The interior water tube 26 is shown in its approximately centered location within the main body of the device. The threaded nozzle 6 is attached to the ¼ inch diameter end of the water tube 26 and the water tube 26 proceeds in a downward direction, perpendicular to the top of the main body of the device, thence after a distance of approximately 2 inches and an approximate 90 degree bend, forward along a straight course parallel to the top of the main body for an additional approximate 5 inches, terminating on the outer surface of the main body of the device in a threaded female connection 8. The diameter of the interior water tube 26 is approximately ¾ inch at is terminus and this is accomplished via a flare from the bend portion of the tube to its terminus. As the interior water tube 26 is making its approximately 90 degree bend, the area of the tube 26 slightly above the bend features a small ¹⁄₃₂ inch diameter hole 15 in the tube, directly opposite from the continuing straight course of the tube, but along the same long axis. As the pressurized water enters the interior water tube 26 at the connecting terminus 8, the greater majority of the pressurized water flows on to be expressed out of the nozzle 6. However, a small stream of pressurized water enters into the interior fluid chamber 24, the same which has been created by joining the upper portion 1 and the lower portion 2 of the main body of the device together. As the pressurized water enters the interior fluid chamber/reservoir 24 through the hole 15 in the interior water tube 26, the chamber 24 is filled with pressurized water itself, and in effect, pressurizes the contents of the fluid chamber 24. It is possible for the operator of the device to unscrew the cap 7 found on the top of the main body and introduce, via pouring, a detergent solution into the interior fluid chamber 24. This must be done when there is no pressurized water whatsoever passing through the device. Following the re-positioning of the screw cap into the prepared threaded boss 21, found as an integral part of the top of the main body of the device, the pressurized water enters the interior fluid chamber 24 via the hole 15 in the interior water tube 26 and, in effect pressurizes the interior fluid chamber 24 and mixes with and agitates the added detergent solution to create a detergent-water mix, which when the fluid chamber 24 is filled, is expressed under pressure through the small diameter tube 5 to the exterior of the main body of the device. The small diameter tube 5 passes through the upper portion 1 of the main body through a enlarged boss 22, which adds support for the tube, both static and when the tube 5 contents are under pressure. The small diameter tube 5 is slightly angulated, facing the main fan-shaped spray pattern emanating from the nozzle 6 when the device is in use and the stream of detergent-water mix is directly injected into the base portion of the fan-shaped spray pattern. The detergent mix is then incorporated into the outcoming pressurized water spray pattern emanating from the nozzle 6, and carried to the underside of the automobile, adding a detergent cleaning action to the spray, vastly improving the said cleaning action. As the pressurized water continues to enter the fluid chamber 24 through the hole 15, the detergent-water mix is diluted until all of the detergent-water mix has been expressed out through the small diameter tube 5 and nothing but pure, pressurized water is contained in fluid chamber 24. The said pure water is itself continuously expressed through the small diameter tube 5 and into the fan-shaped spray nozzle 6 pattern, thus only pure water is now being applied to the undercarriage of the automobile, and in effect, a rinsing action is provided which will very effectively remove the remaining detergent from the surface of the undercarriage of the automobile.

Figure 3:
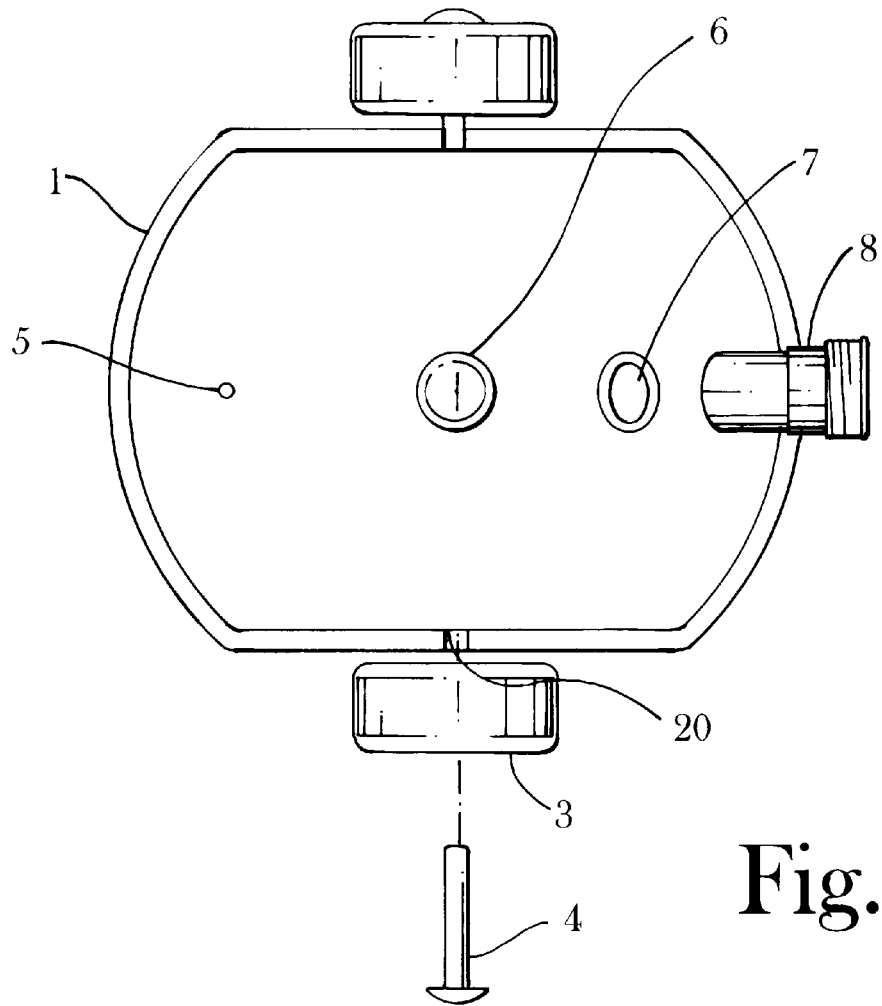
FIG. 3 is a top view of the body as shown in FIG. 1 with its connecting parts

FIG. 3 shows a top view of the upper body portion 1 of the undercarriage washing/cleaning device. Illustrated are the relative positions of the water spray nozzle 6 and the adjacent small diameter tube 5 exit and screw cap 7 which appear along the same centrally located long axis on the top of the main body of the device. The exit of the interior water tube from the interior of the device to the outside of the device is shown and ends in a female terminus 8 that will accept a male standard plumbing connection. On the sides of the device the two optional wheels 3 are shown, one "connected" and the other in an exploded view. The drive pin fastener 4 passes through the center of the wheel 3 and into the prepared locking boss 20 which is an integral part of the body of the device itself. When the drive pin fastener 4 is fully "seated", it locks the wheel 3 in position and acts as an axle upon which the wheel 3 rotates.

Figure 4:
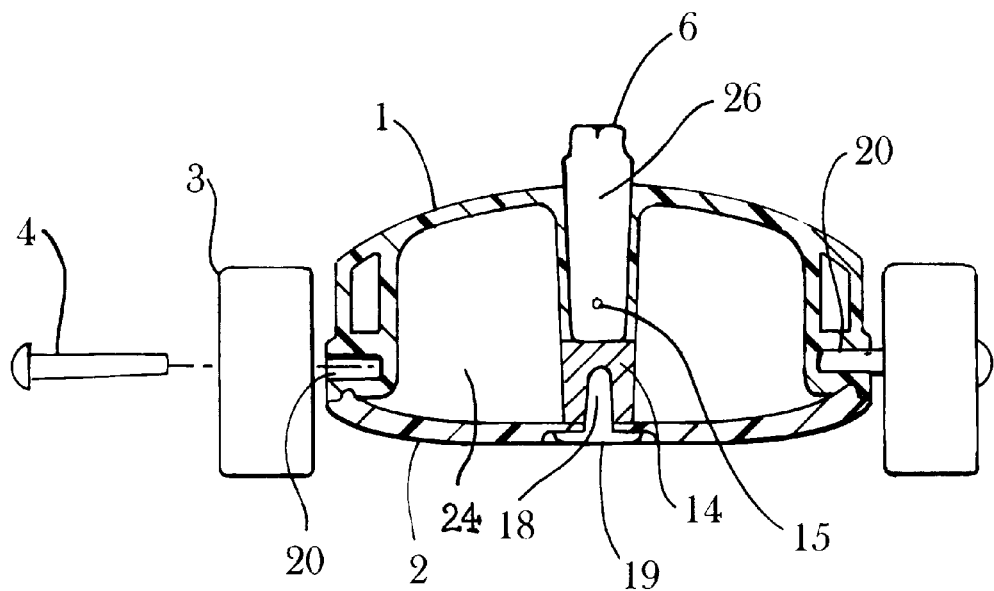
FIG. 4 is a rear cut away view of the body as shown in FIG. 1 showing the interior construction of the body

FIG. 4 shows a rear cut-away view of the main body of the undercarriage washing/cleaning device. The top portion 1 is fully connected and seated to the lower portion 2, creating the hollow fluid containing chamber 24. The drive pin fastener 19 has fully passed through the centered, prepared hole 18 on the lower body portion 2 and is fully seated in the positive locking seat 14 found directly attached to and a part of the interior water tube 26. The placement of the 1/32 inch hole 15 at the base of the interior water tube 26 is shown. This is directly opposite the continuing course of the interior water tube 26, after the approximate 90 degree bend allows the tube to continue and pass through to the outer section of the device, but along the same long axis. The removable spray nozzle 6 is shown fully connected to the interior water tube 26. The placement of the two optional wheels 3 are shown along the sides of the body of the device—one "attached" and one in an exploded view for illustrative purposes. The drive pin fastener 4 passes through the center of the wheel 3 and, when fully seated into the prepared locking boss 20, acts as an attachment for the wheel 3 and also as an axle, which the wheel 3 can rotate around.

Figure 5:
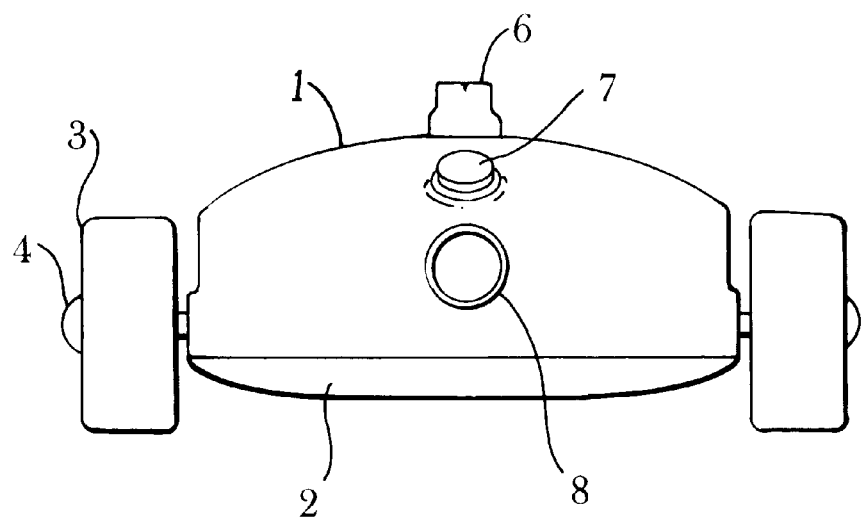
FIG. 5 is a front view of the body as shown in FIG. 1 with its connecting parts in place

FIG. 5 shows a frontal view of the undercarriage washing/cleaning device. The upper portion 1 and lower portion 2 of the main body of the device are fully joined together. The spray nozzle 6 is shown placed on top of the main body of the device. A view is given of the terminus of the interior water tube 8 and the screw cap 7 is shown adjacent to, but slightly away from the nozzle 6, but along the same long axis centered on the top of the main body of the device. The optional wheels 3 are shown fully fixed in place with the drive pin fasteners 4. A view is given of the disk-like, sled-shaped lower body portion 2. This feature is not in use when the optional wheels 3 are in place and fully functional.

Figure 6:
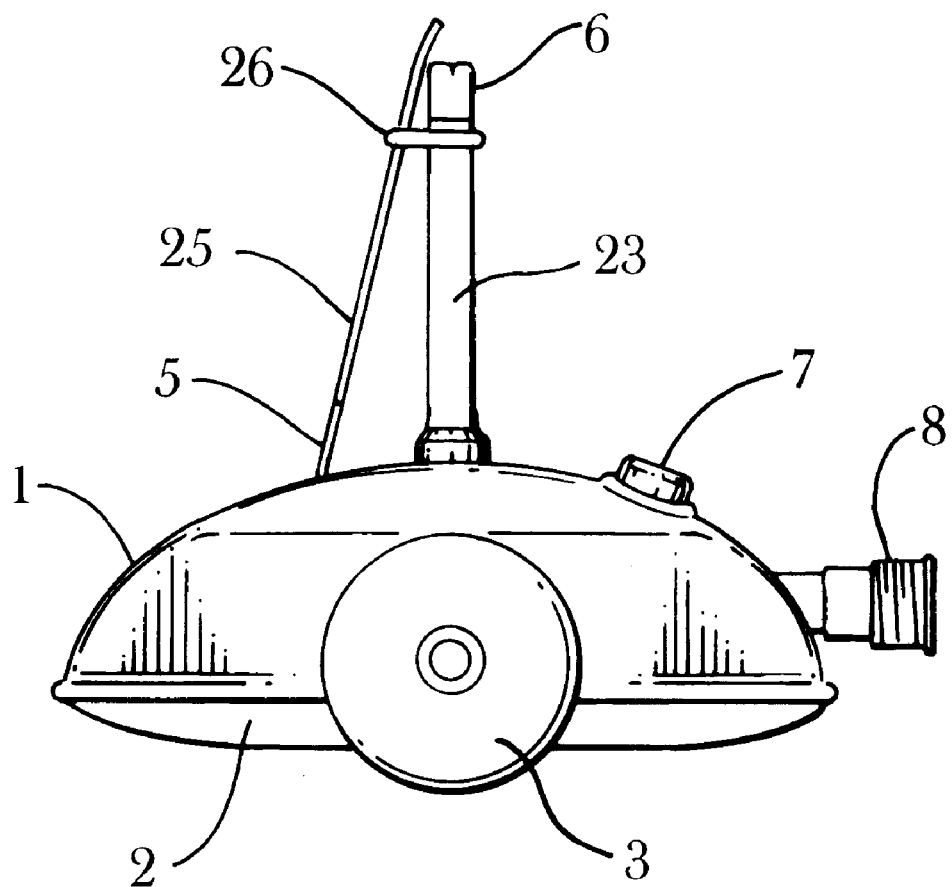
FIG. 6 is a side view of the body as shown in FIG. 1 and illustrates the connection of an extension pipe to the main body and an extension tube from the detergent tube up along and connected to the extension pipe

FIG. 6 shows a side view of the undercarriage washing/cleaning device with an extension pipe 23 fitted and screwed into the top threaded portion of the interior water tube, which is flush with the surface of the upper body portion 1 of the device. The lower body portion 2 is fully engaged to the upper body portion 1. The nozzle 6 is then attached via a threaded connection to the top of the extension pipe 23. A connecting tube 25 is in place, joining the small diameter tube 5 and passing through a tube holder 26, which is itself attached to the extension pipe 23. The connecting tube proceeds toward its terminus in relatively the same positional relationship with the nozzle 6 as would be found in the normal relationship between the small diameter tube 5 and the nozzle 6 were the extension pipe 23 not in place. This allows for the detergent-water mix which is added through screw cap 7, to be again added to the base of the spray fan pattern of the nozzle 6 when the device is in active use with pressurized water, which enters the device via the terminus of the interior water tube female connector 8. The extension pipe 23 and small diameter tube extension 25 allow the operator to deliver the optimum water spray pattern to a higher ground clearance vehicle, such as an off-road vehicle or truck. The optional side wheel 3 is shown in place and fully fixed and functional.

A slight dome shape is apparent to the top of the body 1 as shown in FIGS. 1, 2, 4, 5, and 6. This allows for the water deflection away from the body 1 itself when the spray water bounces back after hitting the undercarriage surfaces. The feature allows the deflection of debris such as the road salt and mud on the top of the body 1 which could contribute to the eventual clogging of the nozzle 6.

As various changes can be made to the above construction without departing from the scope of this invention, it is intended that all matter contained in the above description or shown in the accompanying drawings shall be interpreted as illustrative and not in a limited sense.

I claim:

1. In a vehicle undercarriage washing/cleaning device having a wheeled body moveable over the ground by a rigid, non-flexible water pipe extending vertically downward from a hand-controllable valve connectable to a water source, the water pipe curving to enter the body horizontally and passing through a right angle within the body as an interior water tube to emerge therefrom vertically at a spray nozzle, there being a reduction in the inside diameter of the pipe within the body, the improvement comprising:

a sealable fluid chamber/reservoir within the body enclosing the interior water tube;

a sealable opening in the chamber provided with a removable plug for introducing fluid into the chamber;

an orifice in the interior water tube within the chamber; and a small diameter tube exiting the chamber in a direction aimed at any spray that emerges from the spray nozzle.

2. The device of claim 1 wherein the wheels are removable.

3. The device of claim 2 wherein the underside of the body is configured to slide over the ground.

4. A vehicle undercarriage washing/cleaning device disposed for placement on and manual movement over a ground surface comprising:

a first element comprising a body to which is attached a female water pipe connection that is substantially horizontal when the device is placed on or moved over the ground surface and a substantially vertical water dispensing spray nozzle the both of which are connected within the body by an interior water tube which has a diameter varying from about ¾ inch to about ¼ inch, the interior water tube having an approximately right angle from the horizontal position of the water pipe connection to the vertical position of the water dispensing nozzle, the body being comprised of an upper dome-like portion which is joined together with a lower, ovoid-disk-like, sled-shaped portion; the upper and lower portions being joined by matching upper and lower insets along the perimeters of both the upper and lower portions of the body that sealingly engage, to form an internal fluid chamber through which the interior water tube passes, when the lower portion of the body is slightly flexed and seated against the upper portion of the body and, as the lower portion of the body is seated, a drive pin fastener is pushed through an approximately centered, recessed hole on the underside of the lower portion of the body and is seated and engaged by a locking boss that is formed into and is an integral part of the inside of the upper portion of the body; there being a threaded portion of approximately ¼ inch at a terminus of the vertical part of the interior water tube that is flush with the top of the body of the device and approximately centered relative to the top surface of the body, at which point the water dispensing nozzle is affixed, and there being above the right angle bend in the interior water tube an approximately $\frac{1}{32}$ inch diameter hole; a removable screw cap on the top surface of the body closing access to the internal fluid chamber; a small diameter tube connecting the internal fluid chamber to the exterior of the body, the small diameter tube extending a short distance beyond the top surface of the body to provide a fluid exit with the extension angulated toward an area above the center of the nozzle; and a second element comprising a water pipe of about ¾ inches in diameter made of a rigid, non-flexible material and adapted to being connected to the female water connection of the device by a standard ¾ inch male plumbing connection at one end and connected at the other end to a water control valve, which is connectable to a standard garden type hose, the water pipe further comprising a horizontal path of travel, away from the female connection to the body for a length of about 20 inches and thence via a bend of about 45 to 55 degrees upward from the horizontal to a further length of about 30 inches to the control valve;

whereby, when the internal chamber is provided with a detergent solution via the removable screw cap and the water pipe is connected to a garden-type hose and faucet, the water control valve may be manually controlled to introduce pressurized water resulting in a fan-like spray of water from the nozzle while water flowing through the hole in the interior water tube fills the internal chamber and drives a stream of detergent/water mix out the small diameter tube directly injecting the detergent mix into the lower portion of the fanspray pattern to cleanse the undercarriage of a wheeled vehicle as the body of the device is pushed and pulled by an operator underneath the vehicle, the operator using the optionally attached wheels on smooth surfaces or operating without wheels whereupon the lower portion disk-like, sled-shape contacts the ground surface and further whereby dilution of the detergent/water mix in continued use without refilling detergent results in a rinsing spray of water.

5. The vehicle undercarriage washing/cleaning device of claim 4 wherein said water pipe is fabricated in more than one section and said sections are joined by a threaded or quick connect fitting whereby said device can be dissembled with ease into its component parts for storage or replacement of damaged parts.

6. The vehicle undercarriage washing/cleaning device of claim 4 wherein said nozzle is detachable whereby various spray patterns and water release volumes readily can be provided by changing nozzles.

7. The vehicle undercarriage washing/cleaning device of claim 4 that is capable at the nozzle connection orifice of having an extension pipe affixed and a nozzle placed on top of the extension pipe in order to deliver a full cleansing spray to vehicles having increased ground clearance.

8. The vehicle undercarriage washing/cleaning device of claim 4 wherein there is an extension pipe intermediate the body and the nozzle a flexible tube connected to the exit of the small diameter tube, the flexible tube following a course along the side of the extension pipe, the flexible tube being fixed via a connecting ring to the extension pipe and terminating in a direction aimed at any spray that emerges from the nozzle whereby a cleansing spray may be delivered to vehicles such as off-road vehicles or trucks having an increased ground clearance.

9. The device of claim 4 further comprising wheels which are removably attached via drive-pin fasteners to one or more locking bosses which are an integral part of the upper portion of the body, the drive-pin fasteners acting as axles for rotation of the wheels.

* * * * *